(12) United States Patent
Kovach et al.

(10) Patent No.: US 8,763,717 B2
(45) Date of Patent: *Jul. 1, 2014

(54) PIVOTING GAUGE WHEEL

(71) Applicant: CNH America LLC, New Holland, PA (US)

(72) Inventors: Michael G. Kovach, Morton, IL (US); Greg S. Smart, Bettendorf, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,610

(22) Filed: Oct. 2, 2012

(65) Prior Publication Data

US 2013/0087353 A1     Apr. 11, 2013

Related U.S. Application Data

(63) Continuation of application No. 12/247,547, filed on Oct. 8, 2008, now Pat. No. 8,291,997.

(51) Int. Cl.
*A01B 63/16* (2006.01)

(52) U.S. Cl.
USPC .......................... 172/395; 172/396; 172/419

(58) Field of Classification Search
USPC ................... 172/395, 396, 419, 427
See application file for complete search history.

(56) References Cited

U.S. PATENT DOCUMENTS

| | | | |
|---|---|---|---|
| 2,772,617 A | 12/1856 | Tangeman |
| 757,999 A | 4/1904 | Davis |
| 1,661,237 A | 3/1928 | Shaw |
| 1,667,866 A | 5/1928 | Olson |
| 1,760,001 A | 5/1930 | Reynolds |
| 2,045,461 A | 6/1936 | Goodman |
| 2,918,300 A | 12/1959 | Hendrickson |
| 3,559,747 A | 2/1971 | Cline |
| 3,870,107 A | 3/1975 | Orthman |
| 4,057,112 A | 11/1977 | Taylor |
| 4,520,876 A | 6/1985 | Peterson et al. |
| 4,702,323 A | 10/1987 | Smit et al. |
| 4,819,737 A | 4/1989 | Frase |
| 4,883,126 A | 11/1989 | Leland |
| 4,974,683 A | 12/1990 | Hanig et al. |
| 5,086,847 A | 2/1992 | Meiners |
| 5,392,863 A | 2/1995 | Fixemer |
| 5,476,147 A | 12/1995 | Fixemer |
| 5,813,472 A | 9/1998 | Fixemer |
| 6,076,613 A | 6/2000 | Frasier |
| 6,758,284 B2 | 7/2004 | Myers |
| 7,398,983 B2 | 7/2008 | Van Den Engel |
| D585,461 S | 1/2009 | Kovach et al. |

*Primary Examiner* — Thomas B Will
*Assistant Examiner* — Joel F. Mitchell
(74) *Attorney, Agent, or Firm* — Rebecca L. Henkel

(57) ABSTRACT

Embodiments of the invention provide an innovative arrangement to control the height of ground engaging tools located on agricultural implements via gauge wheel assemblies, particularly for supporting and adjusting the height of winged extensions of the implement frame. The gauge wheel assemblies may provide an adjustment assembly in the form of a screw jack, which can be coupled to a support bracket that is attached to the implement frame and also coupled to a support tube that is coupled to a gauge wheel via pivot assembly and a bracket. The bracket and support tube may be coupled at discrete positions according to the height adjustment of the screw jack via pins and holes in the bracket and tube. When coupled, the pins and holes of the support bracket and tube may reduce the load of the winged extensions on the screw jack mechanism.

20 Claims, 7 Drawing Sheets

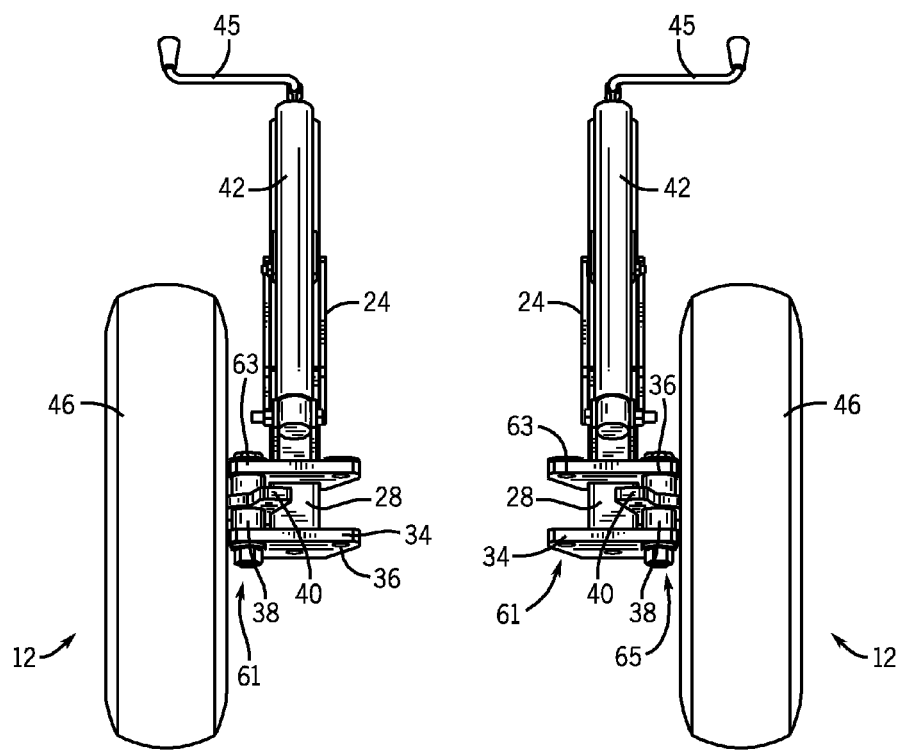

PIVOTING GAUGE WHEEL

CROSS REFERENCE TO RELATED APPLICATIONS

This application is a continuation of U.S. patent application Ser. No. 12/247,547, entitled "PIVOTING GAUGE WHEEL", filed Oct. 8, 2008, which is herein incorporated by reference.

BACKGROUND

The present invention relates generally to the field of agricultural implements such as planters, seeders and other wide, foldable implements towed behind a work vehicle, such as a tractor.

Discs or cultivators, for example, are commonly towed behind tractors and may cover wide swaths of ground which may be tilled or untilled. Such implements typically loosen the soil, dislodge weeds, and reclose the soil in a single operation. To make the operation as efficient as possible, wide swaths of ground may be covered by extending wings on either side of a central section of the implement pulled by the tractor. These wings are commonly disposed in a floating arrangement during the farming operation, wherein the wing assemblies allow the implement to contact the soil as the implement is towed across varying elevations. As the wing assemblies encounter varying elevations, wheel assemblies including gauge wheels may be used to support the wing assemblies and the tools attached thereto. The gauge wheels may be disposed throughout the wing assemblies of the implement to support and control the height of the tools and frame of the floating wing assemblies.

The gauge wheels may feature mechanisms to allow the height of the wing assemblies and ground engaging tools to be adjusted depending on operating depths and other factors. Adjusting the height of the gauge wheels may be difficult or time consuming for a single operator due to the load placed on the gauge wheels of current implements. Further, during a farming operation debris may impact the gauge wheels and the adjustment mechanism, putting wear and tear on the entire assembly.

BRIEF DESCRIPTION

Embodiments of the invention provide an innovative arrangement to control the height of ground engaging tools located on agricultural implements via gauge wheel assemblies, particularly for supporting and adjusting the height of winged extensions of the implement frame. The embodiments may be used in a wide range of settings, but is particularly well-suited to implements such as cultivators, discs, plows, and so forth in which winged extensions are used to cover wide swaths of terrain that is often of varying elevation. In one particular embodiment, for example, the gauge wheel assemblies may provide an adjustment assembly in the form of a screw jack, which can be coupled to a support bracket that is attached to the implement frame and also coupled to a support tube that is coupled to a gauge wheel via pivot assembly and a bracket. The bracket and support tube may be coupled at discrete positions according to the height adjustment of the screw jack via pins and holes in the bracket and tube. When coupled, the pins and holes of the support bracket and tube may reduce the load of the winged extensions on the screw jack mechanism. Further, the pivot assembly of the gauge wheel may be pivotable, allowing the gauge wheel to turn as the implement turns in a field. The embodiments may be applied to many types of agricultural implements to allow for easier control over the height of the tools located on the winged extensions, while shifting the wing extension load to a more robust coupling and reducing overall maintenance and wear that a gauge wheel assembly may incur as the implement is drawn across fields.

DRAWINGS

These and other features, aspects, and advantages of the present invention will become better understood when the following detailed description is read with reference to the accompanying drawings in which like characters represent like parts throughout the drawings, wherein:

FIG. 6 is a front view of an embodiment of the pivoting gauge wheel assembly shown in FIG. 4, configured for placement on the left side of an implement frame, when viewed from the rear;

FIG. 7 is a front view of an embodiment of the pivoting gauge wheel assembly shown in FIG. 4, configured for placement on the right side of an implement frame, when viewed from the rear;

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed in detail below, various configurations of implement supporting gauge wheels may be employed to improve durability, simplify use, and simplify manufacturing. For example, the embodiments discussed below may include a screw jack and a support tube and bracket to enable a simple and robust height adjustment for an agricultural planter. By utilizing and support tube and bracket, the arrangement provides a rigid coupling that eliminates stress and wear on the screw jack after the desired implement height has been reached. As discussed further below, the embodiments enable reduced parts during manufacturing by providing a pivoting bracket and wheel assembly that allows the wheel and tire to be mounted on either side of the pivoting bracket. In other words, the same components may be used for the gauge wheel assembly whether it is mounted on a left or a right wing portion of an agricultural implement. As discussed below, the embodiments of a gauge wheel for agricultural implements improves reliability, simplifies use and maintenance, and reduces overall costs and complexity.

Figure 1:
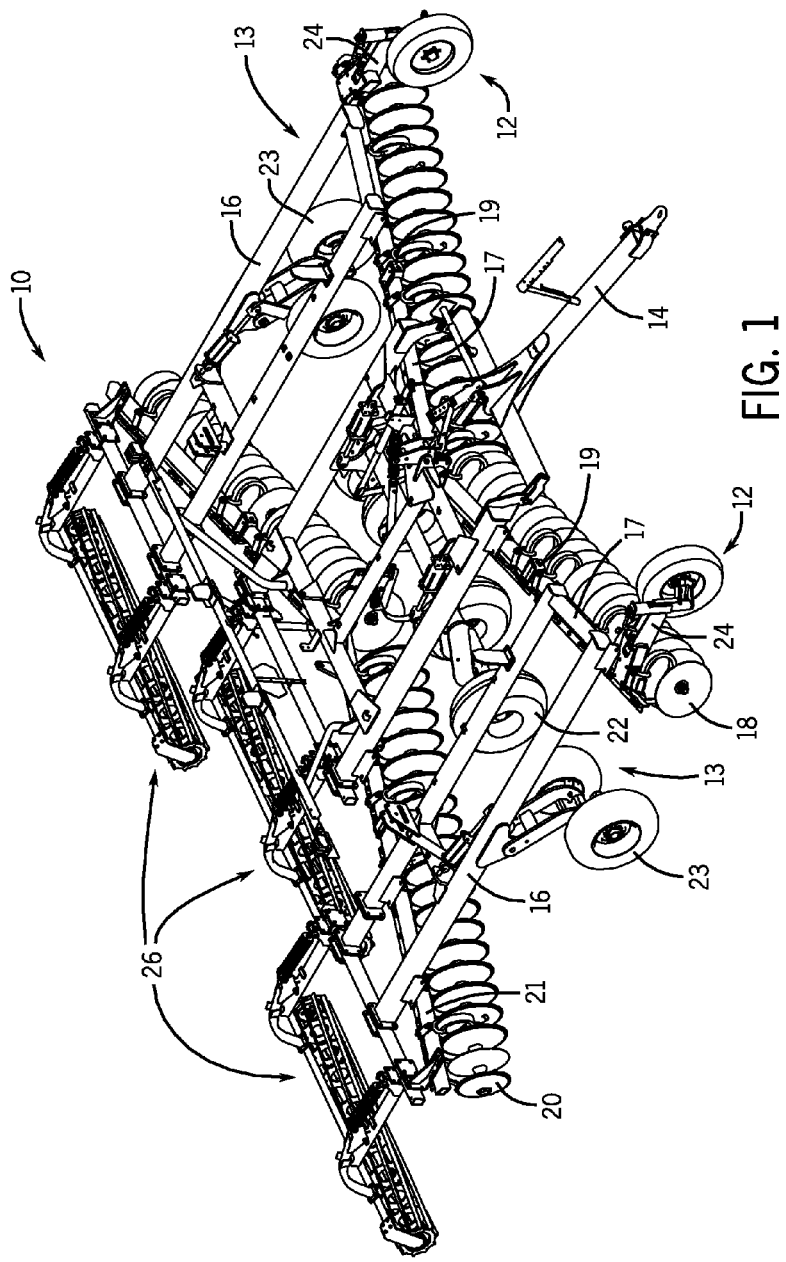
FIG. 1 is a perspective view of an embodiment of the agricultural implement in accordance with aspects of the invention, featuring pivoting gauge wheel assemblies.

Turning now to the drawings, and referring first to FIG. 1, a perspective view of an embodiment of agricultural implement 10 is illustrated in the form of a tandem disk system. The implement 10 is designed to be towed behind a work vehicle, such as a tractor. The implement 10 includes gauge wheel assemblies 12 which are used to guide the floating wings 13 of implement 10 as it travels across a terrain. In the present context, gauge wheel assemblies 12 may also be referred to as stabilizer wheels or gauge wheels. The implement 10 may be attached to the tractor via hitch assembly 14. Hitch assembly 14 may be connected via bolts or other suitable couplings to implement frame 16. Implement frame 16 may include front tool bar 17, which may be coupled to front disk row 18. Structural members of implement 10, such as frame 16 and hitch assembly 14, may be made of any suitable material, such as structural steel. In addition, implement frame 16 may include rear tool bar 19, which may be coupled to rear disk row 20, as shown in the diagram. Further, the implement 10, as shown, is one of many possible embodiments of an agricultural disc or cultivator system that may utilize the features that will be discussed below.

Agricultural implement 10 also includes transport wheels 22 that may be coupled to implement frame 16. The wheels 22 are configured to raise the frame 16 and the attached tools from ground contact when the implement is in a transport mode, i.e. not farming or tilling. In the embodiment, transport wheels 22 may be disposed underneath implement frame 16 in order to support the central portion of implement frame 16 and all the elements attached thereto. In particular, front disk row 18 and rear disk row 20 may be lifted by transport wheels 22 to prevent damage to the disks during transport. Outer carrying wheels 23 may be coupled to the floating wing portion 13 of frame 16, thereby reducing the load on gauge wheels 12 and supporting the rear portion of the floating wing assemblies 13. Outer carrying wheels 23 may be used in addition to transport wheels 22 to enhance mobility when turning on the ends of the field. Gauge wheels 12 may also be raised by transport wheels 22 and outer carrying wheels 23 to prevent wear on the gauge wheels 12 when not being used in a farming operation. Gauge wheels 12 may be coupled to tool bar 17 or frame 16 via gauge wheel bracket 24. Gauge bracket may include clamps and/or c-clamps or brackets and bolts in order to mount the gauge wheel assembly 12 to the implement frame 16. Further, agricultural implement 10 may feature soil finishing attachments or similar devices attached to the rear of the implement, which are generally represented by the numeral 26. In the embodiment, the floating wing assemblies 13 of frame 16 may include pivotal couplings 19 to the rigid central portion of frame 16, thereby enabling the entire left and right portion of the frame 16, along with the disk rows 18 and 20, to follow the contours of the land.

Figure 2:
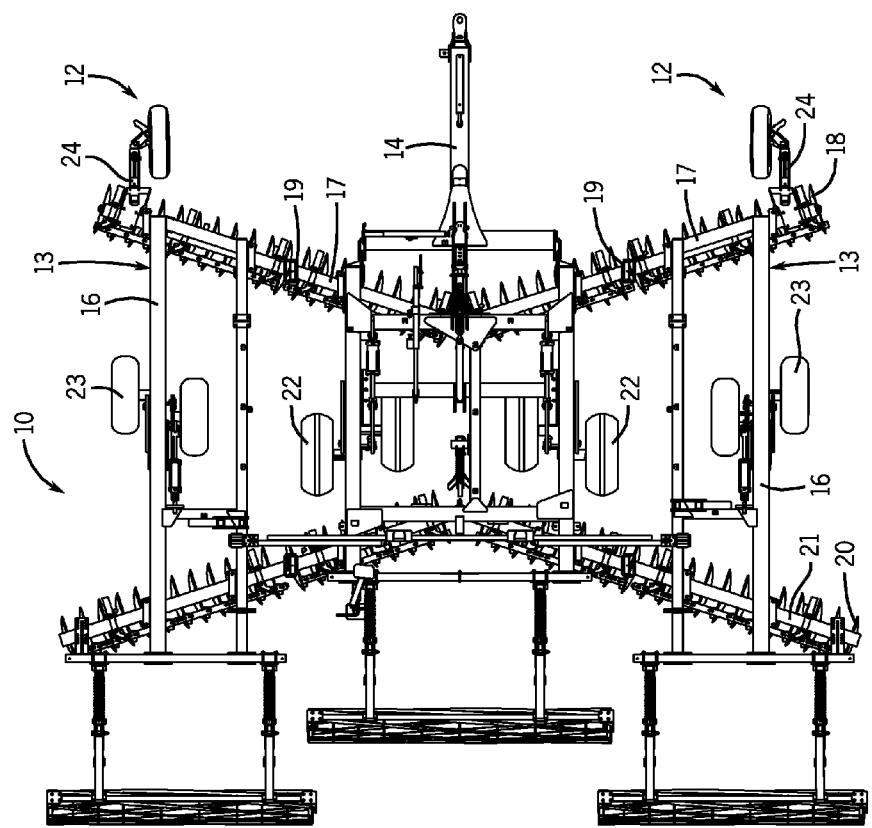
FIG. 2 is a top view of an embodiment of the arrangement in FIG. 1, including the pivoting gauge wheel assemblies and ground engaging disk rows.

FIG. 2 illustrates a top view of an embodiment of the agricultural implement 10. In the embodiment, gauge wheel assemblies 12 are located near the extremities of front tool bar 17. As discussed, front tool bar 17 and rear tool bar 21 may include hinges 19 or other flexible couplings that enable the floating tool bar wings 13 to conform to changes in elevations as the wide implement 10 towed across a swath of soil. Due to the floating nature of the wing assemblies 13, gauge wheels 12 maintain a substantially constant height for ground engaging tools, such as front disk row 18. Accordingly, outer carrying wheels 23 may help maintain the tool height for rear disk row 20. Moreover, central transport wheels 22 may control the height of the disks 18 located near the center of implement frame 16 while gauge wheels 12 control the height of the ground engaging disks 18 located at the extremities of front tool bar 17. For example, as the wing assemblies 13 may encounter a raised region of terrain, the gauge wheel 12 may raise the ground engaging disks 18 near the floating wing assemblies 13 while the central portion of implement 10 may remain at the same height as it is towed across a substantially flat portion of terrain. As depicted, gauge wheels 12 may encounter debris or obstructions prior to any other components of wing assemblies 13 as the implement 10 is being towed in direction 25. Therefore, gauge wheels 12 must include a robust and reliable design that is able to endure a substantial amount of wear and tear.

Figure 3:
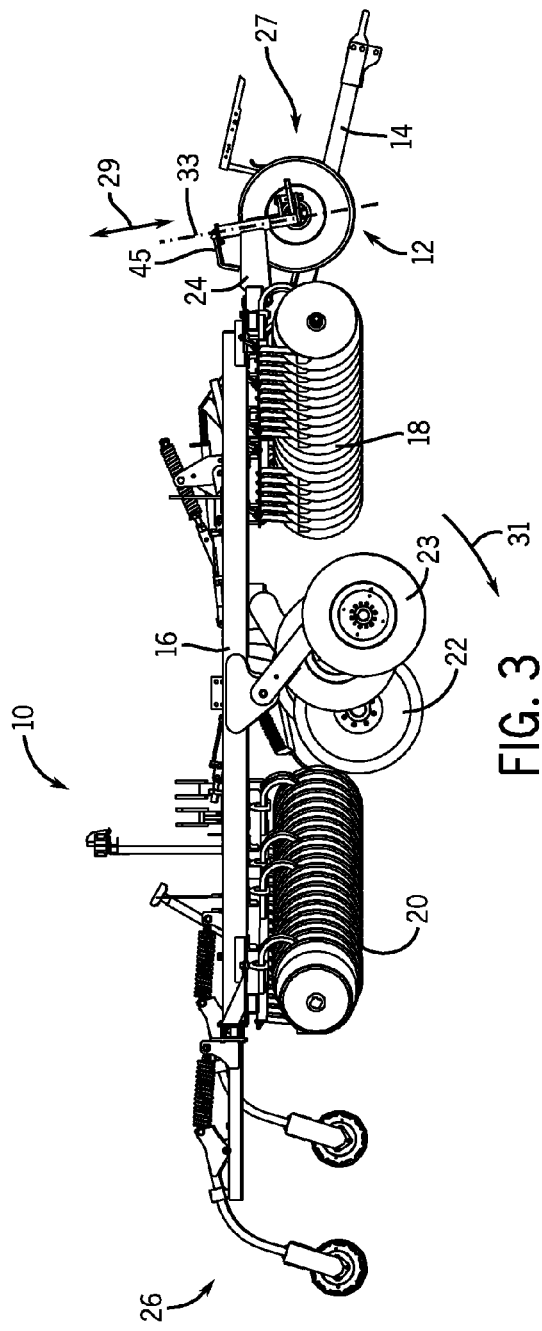
FIG. 3 is a side view of an embodiment of the system shown in FIG. 1, in a transport position with the gauge wheel assemblies and disk rows out of contact with the ground.

FIG. 3 illustrates a side view of an embodiment of agricultural implement 10 featuring gauge wheels 12 in a raised or retracted position 27. Gauge wheels may move in an upward direction 29 to a raised position during a turn at the end of a crop row. In the embodiment, central transport wheels 22 are extended 31 to raise front disk row 18 and rear disk row 20 from ground contact. In the diagram, rear attachment 26 and front gauge wheels 12 are also raised from contact with the ground. As discussed above, when in a transport position, components of agricultural implement 10 are raised from contact with the ground or pavement to avoid wear and tear. The diagram also shows implement frame 16, outer carrying wheels 23, gauge wheel bracket 24 and hitch assembly 14. During transport, a simple height adjustment of gauge wheels 12 by an operator using hand crank 45 eliminates the use of tools for wheel height adjustment. Further, the illustrated embodiment of the gauge wheel 12 eliminates ground contact during transport, reducing unnecessary wear and tear. As previously discussed, when in contact with the ground, gauge wheels 12 allow for rotational movement about axis 33, increasing maneuverability during turns of the implement.

Figure 4:
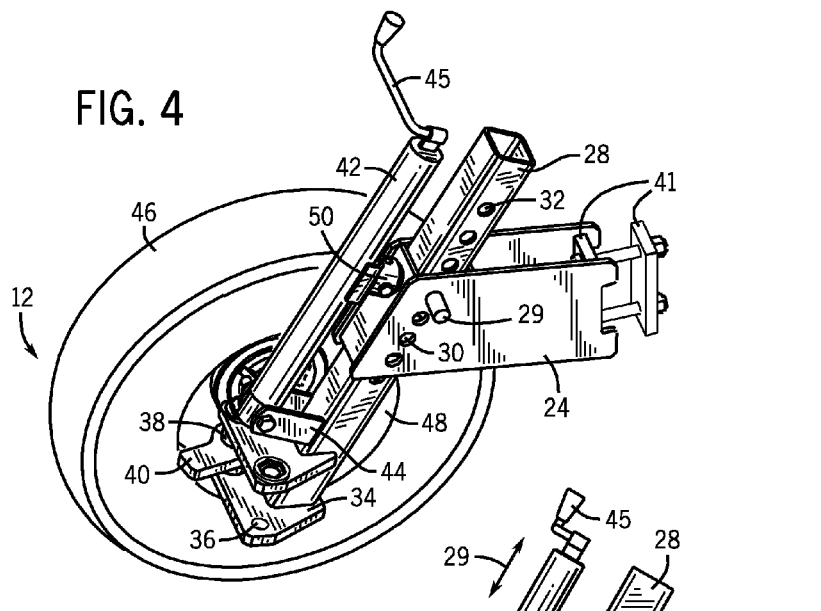
FIG. 4 is a perspective view of an embodiment of the pivoting gauge wheel assembly shown in FIG. 1, shown in detail.

FIG. 4 illustrates the embodiment of gauge wheel assembly 12 shown in FIGS. 1-3 in greater detail. In the embodiment, support tube 28 is located within wheel bracket 24. Support tube 28 and wheel bracket 24 may be rigidly coupled by a pin 29 that may be placed through one of the bracket holes 30 and support tube holes 32, thereby supporting a portion of the load of the floating wing assembly 13. As shown in the diagram, gauge wheel bracket 24 may be coupled to a tool bar 17 via brackets 41, bolts and/or nuts. In other embodiments, support tube 28 may be disposed along a range of continuous positions within bracket 24 via compression or tension members.

A pivot bracket 34 may be rigidly coupled to and disposed at the lower end of support tube 28, as shown in the diagram. In other words, pivot assembly 38 is reversible or interchangeable between a left-hand configuration and a right-hand configuration. Pivot bracket 34 may include holes 36 that allow pivot assembly 38 to be placed on either side of pivot bracket 34. Pivot assembly 38 also includes pivot stop 40, which may be used to restrict the pivotal movement of the gauge wheel assembly 12. The pivot stop 40 may also be referred to as a tang, which connects the wheel 12 to the pivot assembly 38, which will be discussed in detail later.

Figure 10:
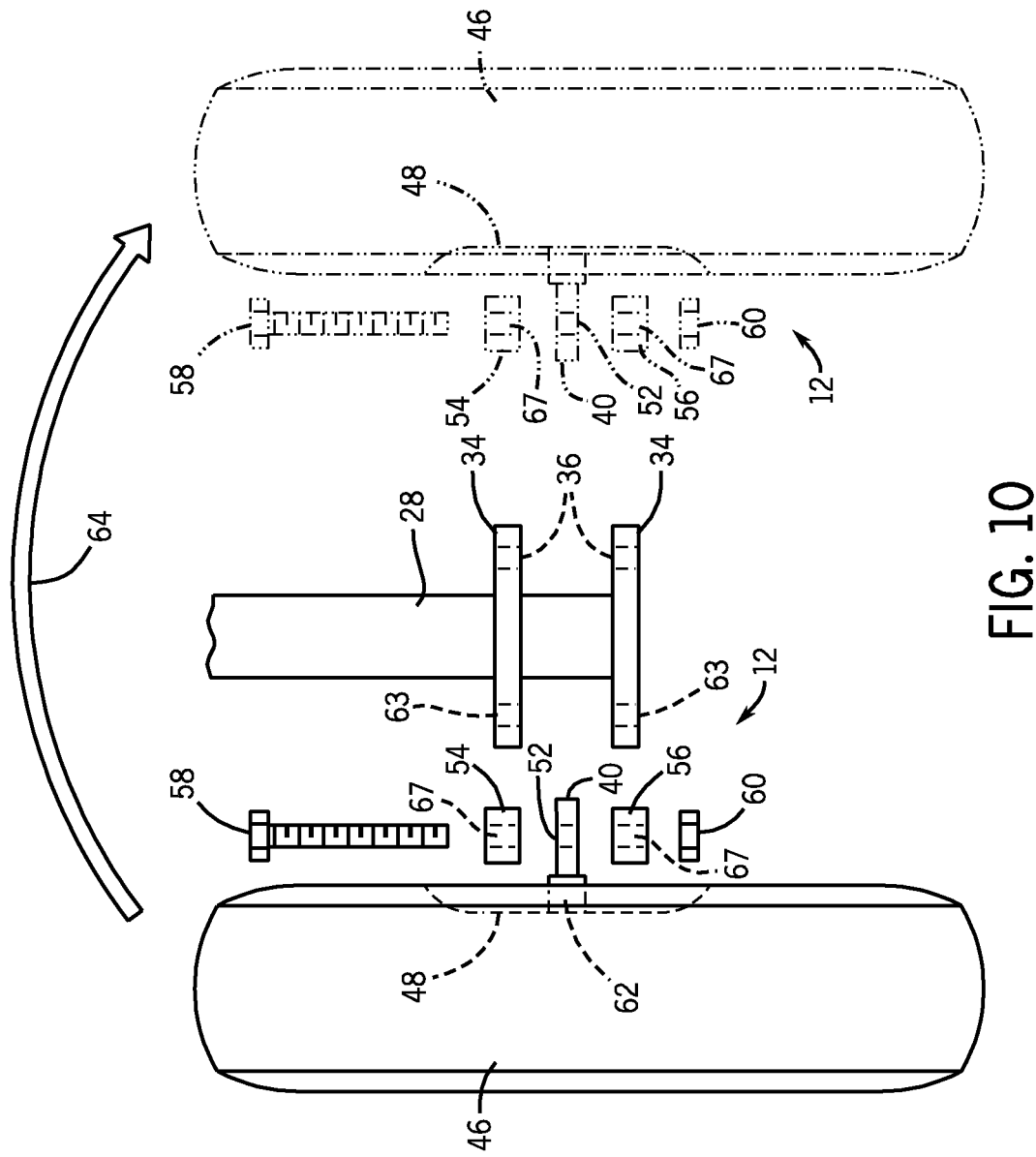
FIG. 10 is an exploded front view of an embodiment of the pivoting gauge wheel assembly shown in FIG. 6.

In the present embodiment, a height adjustment assembly in the form of screw jack 42 may be coupled to support tube 28 via tabs 44 at the lower end of screw jack 42. As shown in the diagram, the upper portion of screw jack 42 is coupled to gauge wheel bracket 24. Further, the adjustment mechanism of screw jack 42 may be operated by screw jack handle 45. Moreover, the rigid coupling of the pin 29 and holes 30 and 32 may reduce wear on the screw jack 42 by supporting a substantial portion of the load of the floating wing assembly 13. Screw jack handle 45 may be turned in order to extend a screw component from the lower end of screw jack assembly 42 which is coupled to tab 44. In other words, a screw component telescopes in and out of the lower portion of screw jack assembly 42 in order to adjust the height of gauge wheel assembly 12, thereby extending screw jack assembly 42. Further, pivot assembly 38 is coupled to tire 46 and wheel rim 48 via pivot stop 40 and other components that are shown in FIG. 10.

As shown in FIG. 4, an embodiment of upper portion screw jack assembly 42 is coupled to bracket 24 via bracket 50. The rigid coupling of screw jack assembly 42 to bracket 24 and support tube 28 enable the extension or contraction of the telescoping screw jack to cause a height adjustment of the gauge wheel 12. For example, the lower portion of the screw jack assembly 42 may extend, causing support tube 28 to slide downward within bracket 24, which is rigidly coupled to the outer portion of the screw jack assembly 42. When the operator has rotated screw jack handle 45 to achieve the desired height for gauge wheel 12, pin 29 may be inserted through holes 30 and 32 to rigidly secure the position of support tube 28 within bracket 24.

Figure 5:
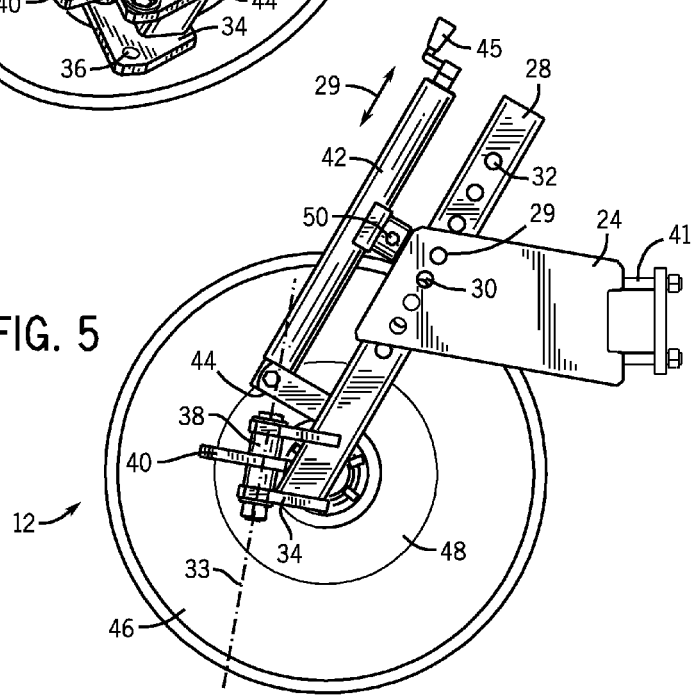
FIG. 5 is a side view of an embodiment of the pivoting gauge wheel assembly shown in FIG. 4.

FIG. 5 illustrates a side view of an embodiment of gauge wheel assembly 12. The diagram shows support tube 28 within wheel bracket 24 which is coupled to screw jack 42 via screw jack bracket 50. In the embodiment, the rigid coupling between the upper portion of screw jack 42 and bracket 24 and the coupling between support tube 28 and the lower portion of screw jack 42 via tabs 44 enable for the height adjustment of gauge wheel assembly 12 as discussed above. The arrangement enables a single operator to adjust the height of gauge wheel assembly 12 after removing the pin 29 by cranking screw jack handle 45 to extend or retract the telescoping screw jack member which is coupled to tabs 44 to the desired gauge wheel height. Pin 29 is inserted in holes 30 and 32, thereby reducing the load of the floating wing assembly 13 from screw jack assembly 42. The embodiment enables screw jack 42 to be used primarily for height adjustment, shown by arrow 29, thereby avoiding wear and tear on the screw jack assembly of sustaining the load of floating wing assemblies 13 during use. The illustration also shows a side view of pivot bracket 34, pivot stop 40, and pivot assembly 38 in greater detail. As shown, pivot stop 40 is coupled to pivot assembly 38, thereby limiting the pivotal range, around axis 33, of gauge wheel assembly 12 by contacting the support tube 28 and the gauge wheel rim 48 to limit the movement of the assembly 38 during turns.

FIGS. 6 and 7 illustrate side views of an embodiment of gauge wheel assembly 12, configured to be mounted on either side of the agricultural implement. FIG. 6 illustrates a gauge wheel assembly 12 placed on the right side of an agricultural implement 10 when viewed from the rear of the implement 10. In the embodiment, pivot assembly 38 is located in the inside portion 61 of the gauge wheel assembly 12. That is, pivot assembly 38 and corresponding fasteners are located in the inside holes 63 of pivot bracket 34. As discussed above, pivot stop 40 is used to control the pivotal movement of gauge wheel assembly 12 as the implement 10 is turned in a field. Similarly, FIG. 7 shows the gauge wheel assembly 12 configured to be placed on the left side of implement 10 when viewed from the rear. Again, pivot assembly 38 is located in the inside portion 65 of pivot bracket 34 and is disposed in the inner set of holes 36 located in pivot bracket 34. As will be appreciated by one skilled in the art, the same components may be used for gauge wheel assemblies 12 where they are placed on the left or right portion of agricultural implements. In the embodiment, moving the tire 46, wheel rim 48, pivot assembly 38 and pivot stop 40 to the other side of the bracket 34 is the only adjustment necessary to change the gauge wheel assembly 12 between opposite sides of an implement. That is, the same components may be used for gauge wheel assemblies 12 throughout an agricultural implement, thereby reducing the number of parts and costs of the agricultural implement. In other words, a single assembly 12 is reversible or interchangeable between a left-hand configuration and a right-hand configuration.

Figure 8:
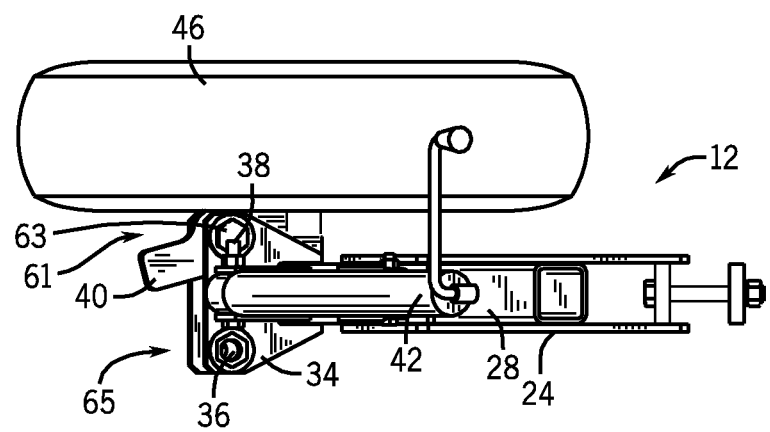
FIG. 8 is a top view of an embodiment of the pivoting gauge wheel assembly shown in FIG. 4, configured for placement on the left side of an implement frame, when viewed from the rear.
Figure 9:
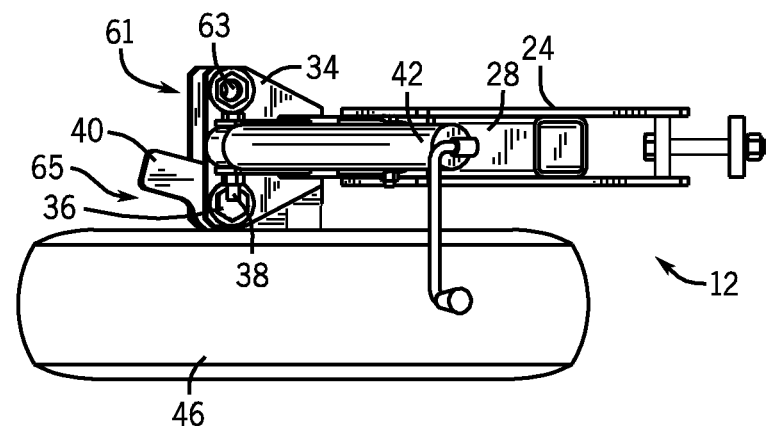
FIG. 9 is a top view of an embodiment of the pivoting gauge wheel assembly shown in FIG. 4, configured for placement on the right side of an implement frame, when viewed from the rear.

FIGS. 8 and 9 show a top view of an embodiment of gauge wheel assembly 12 as shown in FIGS. 6 and 7. As discussed above, the top view of a gauge wheel assembly 12 on the right side of the implement is shown in FIG. 8. In the embodiment, the tire 46, the wheel, pivot assembly 38 and pivot stop 40 are located on the inner portion 61 of pivot bracket 34. FIG. 9 shows a mirror image of FIG. 8, wherein gauge wheel assembly 12 is located on the left portion of a floating agricultural implement. In the present embodiment, the tire 46, the wheel 48, pivot assembly 38 and pivot stop 40 are located on the inside portion 65 of pivot bracket 34.

FIG. 10 illustrates the movement of the components of an embodiment of gauge wheel assembly 12 as it is configured for placement on each side of an implement. The diagram shows a detailed exploded view of the components used to configure the gauge wheel assembly 12 for placement on either side of the implement. As depicted, the gauge wheel assembly 12 is bilaterally symmetrical, allowing placement of the wheel 48 and tire on either side of pivot bracket 34. In the arrangement, pivot stop 40 includes an upper surface 52. Pivot stop 40 includes a hole 36 that is aligned with holes 67 in spacers 54 and 56 for the placement of bolt 58. The assembled configuration may include bolt 58 inserted through pivot bracket holes 36, spacers 54 and 56, and pivot stop 40 with nut 60 securing the end of the bolt 58 against the bottom of pivot bracket 34. In the embodiment, the pivot stop 40 is a flat plate that may be described as a tang that protrudes from a wheel bearing assembly 62. Bearing assembly 62 is a mechanism that permits pivotal movement of the gauge wheel 12. Arrow 64 shows the alternative configuration for gauge wheel assembly 12, with bolt 58, spacers 54 and 56 and pivot stop 40 located on the opposite side of pivot bracket 34. It should be noted that the present configuration illustrates that pivot stop 40 is flipped 180 degrees for attachment to the other side of pivot bracket 34. That is, upper surface 52 is actually facing "downward" in the second configuration, as shown by the hidden lines. The configuration of pivot stop 40 is such that it may be used on either side of the pivot bracket 34 as long as the wheel 48 and tire 46 are rotated 180 degrees in a vertical plane, as generally indicated by arrow 64.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wheel assembly for an agricultural implement comprising:
   a support bracket configured to be coupled to an implement frame;
   a ground engaging wheel rotatably supported by a pivot assembly to permit rotating ground engagement of the ground engaging wheel, the pivot assembly coupled to a portion of a wheel bearing assembly carried next to an axle of the ground engaging wheel, the pivot assembly positioned beside an inside surface of the ground engaging wheel to permit pivoting of the ground engaging wheel about a non-horizontal axis;
   a support tube having a first end and a second end, the first end having a pivot bracket, wherein the pivot bracket includes a mount positioned laterally outward from the support tube, the mount is configured to support the pivot assembly, the pivot assembly is configured to enable the ground engaging wheel to rotate about the non-horizontal axis relative to the support tube, the support tube includes a length extending between the first end and the second end, a substantial portion of the length is positioned next to the inside surface of the ground engaging wheel, and the support tube is configured to be selectively coupled to the support bracket at a plurality of positions along the length of the support tube to define a height adjustment of the ground engaging wheel; and the support tube and bracket both include holes configured to receive a pin for coupling the support tube and bracket to one another in the plurality of positions; and
   an extendable adjustment assembly having a first portion coupled adjacent to the first end of the support tube and next to the inside surface of the ground engaging wheel, and a second portion coupled to the support bracket to enable adjustment of wheel height prior to coupling of the support tube to the support bracket at one of the plurality of positions;
   wherein the ground engaging wheel is configured to independently rotate about the wheel bearing assembly and about the non-horizontal axis during operation.

2. The wheel assembly of claim 1, wherein the mount comprises a first opening positioned on a first laterally outward side of the pivot bracket, and a second opening positioned on a second laterally outward side of the pivot bracket, and wherein the pivot assembly is configured to mount to the first opening and the second opening.

3. The wheel assembly of claim 2, wherein the pivot bracket and the pivot assembly are configured for mounting the ground engaging wheel on a left side or a right side of the support tube.

4. The wheel assembly of claim 1, wherein the support tube and the support bracket are configured to be decoupled from one another for a height adjustment of the ground engaging wheel relative to the support bracket by adjustment of the extendable adjustment assembly.

5. The wheel assembly of claim 1, wherein the extendable adjustment assembly comprises a screw jack.

6. The wheel assembly of claim 1, wherein the pivot assembly includes a stop to limit a pivotal range of the ground engaging wheel.

7. The wheel assembly of claim 1, wherein the pivot assembly is disposed beside a wheel rim surrounding the axle of the ground engaging wheel and the pivot assembly does not extend substantially radially beyond an outer radius of the wheel rim.

8. An adjustable wheel system for an agricultural implement, comprising:
   a support bracket configured to be coupled to an implement frame;
   a ground engaging wheel assembly including a horizontal axle and a ground engaging wheel rotatably mounted on the axle;
   a support tube having a first end, a second end, and a length extending between the first end and the second end, a substantial portion of the length positioned next to an inside surface of the ground engaging wheel, the support tube configured to be selectively coupled to the support bracket at a plurality of discrete positions along the length of the support tube to define a height adjustment of the ground engaging wheel assembly; and the support tube and bracket both include holes configured to receive a pin for coupling the support tube and bracket to one another in the plurality of discrete positions;
   a pivot bracket coupled to the first end of the support tube, wherein the pivot bracket comprises a first opening positioned laterally outward from the support tube on a first lateral side of the pivot bracket, and a second opening positioned laterally outward from the support tube on a second lateral side of the pivot bracket, opposite the first lateral side;
   a pivot assembly coupled to a portion of the ground engaging wheel assembly, wherein the pivot assembly is configured to mount to the first opening and to the second opening, the pivot assembly is positioned next to the horizontal axle and beside the inside surface of the ground engaging wheel, and the pivot assembly is configured to enable the ground engaging wheel of the ground engaging wheel assembly to pivot about a non-horizontal axis; and
   an extendable adjustment assembly having a first portion coupled near the first end of the support tube and a second portion coupled to the support bracket to enable adjustment of wheel height prior to coupling of the support tube to the support bracket at one of the plurality of discrete positions;
   wherein the ground engaging wheel is configured to independently rotate about the horizontal axle of the ground engaging wheel assembly and about the non-horizontal axis of the pivot assembly simultaneously during operation.

9. The adjustable wheel system of claim 8, wherein the ground engaging wheel assembly includes a wheel bearing assembly, and the pivot assembly is coupled to the wheel bearing assembly.

10. The adjustable wheel system of claim 8, wherein the pivot bracket includes a pair of supports extending from the support tube, and at least one support includes the first opening and the second opening.

11. The adjustable wheel system of claim 8, wherein the ground engaging wheel assembly and the pivot assembly are configured for mounting the ground engaging wheel interchangeably on a left side or a right side of the support tube.

12. The adjustable wheel system of claim 8, wherein the support tube and the support bracket are configured to be decoupled from one another for a height adjustment of the ground engaging wheel relative to the support bracket by adjustment of the extendable adjustment assembly.

13. The adjustable wheel system of claim 8, wherein the extendable adjustment assembly comprises a screw jack.

14. The adjustable wheel system of claim 8, wherein the pivot assembly includes a stop configured to limit a pivotal range of the ground engaging wheel.

15. The adjustable wheel system of claim 8, wherein the pivot assembly is disposed beside a wheel rim surrounding the horizontal axle, and the pivot assembly does not extend substantially radially beyond an outer radius of the wheel rim.

16. A wheel assembly for an agricultural implement comprising:
    a support bracket configured to be coupled to an implement frame;
    a support tube configured to be selectively coupled to the support bracket at a plurality of positions along a length of the support tube; and the support tube and support brackets both include holes configured to receive a pin for coupling the support tube and bracket to one another in the plurality of positions;
    a pivot bracket coupled to the support tube, wherein the pivot bracket comprises a plurality of openings positioned laterally outward from the support tube;
    a pivot assembly configured to mount to at least one of the plurality of openings;
    a wheel bearing assembly coupled to the pivot assembly; and
    a ground engaging wheel configured to rotate about the wheel bearing assembly;
    wherein the pivot assembly is positioned beside an inside surface of the ground engaging wheel, the pivot assembly is configured to enable the wheel bearing assembly to rotate about a non-horizontal axis relative to the support tube, and a height of the ground engaging wheel relative to the support bracket is adjustable by selectively coupling the support tube to the support bracket at one of the plurality of positions.

17. The wheel assembly of claim 16, wherein a substantial portion of the length of the support tube is positioned next to the inside surface of the ground engaging wheel.

18. The wheel assembly of claim 16, comprising an extendable adjustment assembly extending between the support bracket and the support tube, wherein the extendable adjustment assembly is configured to adjust the height of the ground engaging wheel prior to coupling the support tube to the support bracket at one of the plurality of positions.

19. The wheel assembly of claim 18, wherein the extendable adjustment assembly comprises a screw jack.

20. The wheel assembly of claim 16, wherein the plurality of openings comprises a first opening positioned on a first lateral side of the pivot bracket, and a second opening positioned on a second lateral side of the pivot bracket, and wherein the pivot assembly is configured to mount to the first opening and to the second opening to enable the ground engaging wheel to be mounted on either lateral side of the pivot bracket.

* * * * *